United States Patent
Pita et al.

(10) Patent No.: US 11,983,653 B2
(45) Date of Patent: May 14, 2024

(54) MACHINE-LEARNING-BASED PREDICTION OF CONSTRUCTION PROJECT PARAMETERS

(71) Applicant: Procore Technologies, Inc., Carpinteria, CA (US)

(72) Inventors: James Adam Pita, Middletown, MD (US); Catherine Knuff, Brooklyn, NY (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 17/521,447

(22) Filed: Nov. 8, 2021

(65) Prior Publication Data

US 2023/0142105 A1 May 11, 2023

(51) Int. Cl.
*G06Q 10/06* (2023.01)
*G06F 18/214* (2023.01)
(Continued)

(52) U.S. Cl.
CPC ..... *G06Q 10/06313* (2013.01); *G06F 18/214* (2023.01); *G06F 18/23213* (2023.01); *G06N 20/20* (2019.01); *G06Q 10/06312* (2013.01)

(58) Field of Classification Search
None
See application file for complete search history.

(56) References Cited

U.S. PATENT DOCUMENTS

| | | | |
|---|---|---|---|
| 11,468,379 B2 * | 10/2022 | Bailey | G06N 5/01 |
| 2013/0325763 A1 * | 12/2013 | Cantor | G06Q 10/06312 706/12 |

(Continued)

FOREIGN PATENT DOCUMENTS

| | | | |
|---|---|---|---|
| CN | 111738538 A | 10/2020 | |
| CN | 112270489 A | 1/2021 | |

(Continued)

OTHER PUBLICATIONS

Al Qady et al. (Mohammed Al Qady, Amr Kandil, Automatic clustering of construction project documents based on textual similarity, Automation in Construction, vol. 42, 2014, pp. 36-49, ISSN 0926-5805, https://doi.org/10.1016/j.autcon.2014.02.006).*

(Continued)

*Primary Examiner* — Matthew D Henry

(74) *Attorney, Agent, or Firm* — Lee Sullivan Shea & Smith LLP

(57) ABSTRACT

A computing platform is configured to: (i) at a first time, input data values for a first set of data variables associated with a given construction project into a first machine-learning model that functions to output a prediction of a first set of reference projects that are similar to the given construction project, (ii) based on historical data for the first set of reference projects, determine a predicted value for a parameter of the given construction project, (iii) at a second time, input data values for a second set of data variables associated with the given construction project into a second machine-learning model that functions to output a prediction of a second set of reference projects that are similar to the given construction project, and (iv) based on historical data for the second set of reference projects, determine an updated predicted value for the parameter of the given construction project.

20 Claims, 5 Drawing Sheets

(51) Int. Cl.
*G06F 18/23213* (2023.01)
*G06N 20/20* (2019.01)
*G06Q 10/0631* (2023.01)

(56) References Cited

U.S. PATENT DOCUMENTS

2018/0150777 A1    5/2018  Han et al.
2020/0241490 A1*   7/2020  Jermann .................. G06F 9/54

FOREIGN PATENT DOCUMENTS

CN   112766536 A   5/2021
JP   2021-111024 A  8/2021

OTHER PUBLICATIONS

Bldbox, 8 pages [online], [retrieved on Jan. 12, 2022]. Retrieved from the Internet URL: https://www.bldbox.com.
Briq, Run Your Construction Business Better, 14 pages [online], [retrieved on Jan. 12, 2022]. Retrieved from the Internet URL: https://www.br.iq.
Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.
International Searching Authority, PCT International Search Report and Written Opinion, PCT International Application No. PCT/US2022/049303, dated Mar. 21, 2023, 9 pages.

* cited by examiner

MACHINE-LEARNING-BASED PREDICTION OF CONSTRUCTION PROJECT PARAMETERS

BACKGROUND

Construction projects are often complex endeavors involving the coordination of many professionals across several discrete phases. Typically, a construction project commences with a design phase, where architects design the overall shape and layout of a construction project, such as a building. Next, engineers engage in a planning phase where they take the architects' designs and produce engineering drawings and plans for the construction of the project. At this time, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

OVERVIEW

When approaching and planning a construction project, it is often necessary to determine estimates of various parameters of the project, such as the estimated cost of completing the project and the estimated time to complete the project. However, because construction projects may be complex endeavors involving multiple different phases and coordination of multiple different parties, it can be difficult to accurately predict such parameters early in the construction project. Additionally, over the course of the construction project, unforeseen circumstances may arise that affect the accuracy of the estimated parameters, so it may also be necessary to determine updated estimates of the project parameters at various times during the project.

Existing approaches for estimating parameters for a new construction project typically involve tasking one or more individuals associated with the project (e.g., one or more individuals employed by the owner of the new project) with reviewing historical information about past construction projects that appear to be similar to the new project and then trying to come up with estimated parameters for a new construction project, such as estimated cost and/or time to complete the project, based on that review. However, such existing approaches have various limitations.

For instance, the individual conducting the review may only have access to historical information for a limited universe of prior construction projects (e.g., prior construction projects commissioned by the owner of the new project only) and may thus be unable to identify past projects that are sufficiently similar to the new project, which makes it difficult or impossible to come up with accurate estimates for the new project.

Further, even if the individual conducting the review has access to historical information for a larger universe of past construction projects, it becomes increasingly difficult for the individual to wade through and synthesize the historical information for all of these past construction projects—which is typically memorialized in an array of disparate electronic files such as spreadsheets or perhaps even paper files—in order to come up with an accurate determination of which prior projects should be used as the basis for estimating the parameters for the new project or how the historical information about these past products should be aggregated together to produce the estimates for the new project. Not only is this process time consuming, labor intensive, and prone to human error, but it also give rise to a problematic conflict—the best way to improve the accuracy of the estimated parameters for a new project is to evaluate historical information for a larger universe of past projects so as to increase the likelihood of identifying past projects having sufficient similarity to the new project, but there are practical limitations on how much historical data can actually be reviewed and analyzed by a human in order to identify similar projects, which restricts how many past projects can be practically analyzed and thus limits the overall accuracy of the estimates.

Further yet, because of the time consuming and labor intensive nature of existing approaches for estimating parameters for a new construction project, it is typically only practical to estimate the parameters for the new project once at the outset of the project, and there is currently no practical mechanism for reevaluating and updating these estimates at a later point in the project as additional information about the project becomes available—despite the fact that this additional information may allow for a more accurate determination of which past projects are most similar to the new project.

To help address the aforementioned and other problems, disclosed herein is new software technology for predicting certain parameters of a given construction project (e.g., estimated cost and/or time to completion) by employing multiple stages of machine-learning models that are to be executed at different times during the course of the project—each of which is configured to predict which past construction projects are most similar to the given construction project based on a different set of features for the given construction project that are expected to be available at a different time during the course of the project—and then using historical parameter information for the past construction projects identified at each stage to predict corresponding parameters of the given construction project. In this respect, the machine-learning model at each stage may be configured to identify similar construction projects by (i) receiving, as input, data that is available for a respective set of data variables that indicate a respective set of characteristics of the given construction project (i.e., a respective set of features for the given construction project) and (ii) based on an evaluation of the received data for the respective set of data variables, outputting a prediction of one or more past construction projects that have a sufficient level of similarity to the given construction project (e.g., past construction projects having similar values for the respective set of data variables). In this respect, the machine-learning model at each stage may be capable of evaluating a much larger universe of prior construction projects (and historical information related thereto) than could practically performed by a human when evaluating similar construction projects, which will generally provide a more accurate identification of similar construction projects than was previously possible.

Different machine-learning models may be used at different times during the construction project to identify the one or more past construction projects that have a sufficient level of similarity to the given construction project, and each such model may be configured to receive data for a different set of data variables. In some examples, the sets of variables for the models may build from one model to the next, such that each subsequent model may be configured to receive data for all of the data variables of the previous model plus one or more additional variables. In other examples, a subsequent model may be configured to receive (i) data for an entirely different set of data variables than the previous model or (ii) data for some of the same data variables from the previous model and some different data variables. In any case, the change in data variables from one model to the next may reflect the fact that data for different types of variables that are predictive of similar projects are likely to become available at different times during the project.

In this respect, the respective set of data variables that may serve as input for each stage's machine-learning model can take various forms, which may depend on factors such as the data that is expected to be available at the time that the stage's machine-learning model is to be executed and/or the expected predictive power of the data variables available at the time that the stage's machine-learning model is to be executed. As one possibility, the respective set of input data variables for a given stage's machine-learning model may include one or more data variables that indicate a physical size of the construction project, such as an area (e.g., a square footage) of a building or property associated with the project or a number of floors of a building associated with the project. As another possibility, the respective set of input data variables for a given stage's machine-learning model may include one or more data variables that indicate a location of the construction project, such as a zip code, a city, a county, a state, a nation, or an indication of whether the project is located in an urban, suburban, or rural area. As another possibility, the respective set of input data variables for a given stage's machine-learning model may include one or more data variables that indicate an intended use of the construction project, such as an occupancy classification or some other information indicating whether the construction project is for residential, industrial, business, or educational use, to name a few. As yet another possibility, the respective set of input data variables for a given stage's machine-learning model may include one or more data variables that indicate a type of construction to be performed in connection with the construction project, such as whether the construction project involves new construction versus renovation of an existing building, or if the construction involves or is limited to a particular infrastructure subsystem, such as HVAC, plumbing, or electrical, to name a few. It should be understood that these examples are merely illustrative and that the set of input data variables for a given stage's machine-learning model can take other forms as well and may include any data that is potentially predictive of a parameter of interest of the construction project.

In practice, the multiple stages of machine-learning models disclosed herein may be incorporated into and executed by software for managing construction projects, among other possibilities. For instance, Procore Technologies, Inc. ("Procore"), who is the assignee of the present application, offers construction management software that is provided to users in the form of a software as a service ("SaaS") application, which includes back-end software that runs on a back-end computing platform and front-end software that runs on users' client stations (e.g., in the form of a native application, a web application, and/or a hybrid application, etc.) and can be used to access the SaaS application via a data network, such as the Internet. Using Procore's SaaS application, a user may input information about a construction project through a client station running the front-end software, and this then results in corresponding data about the project being received by the back-end platform, typically by virtue of the client station sending the data to the back-end platform via the Internet, and then stored by the back-end platform for future access. The back-end platform may then use some or all of this data when executing the multiple stages of machine-learning models disclosed herein.

For instance, when initially creating a construction project, Procore's SaaS application allows a user to input an initial set of information about the project, such as a type of construction (e.g., new build versus renovation), a square footage, and/or a plain language description of the project, and the back-end platform may store this initial set of information as data for a first set of data variables that provide initial information about the project and that the back-end platform can use as input data for an initial machine-learning model and/or for one or more subsequent stages of machine-learning models. Additionally, after the initial creation of a construction project, Procore's SaaS application allows users to request creation of various data entities associated with the construction project, such as data entities corresponding to bids, drawings, specifications, schedules, requests for information (RFIs), contractor submittals, and meeting minutes, to name a few examples. Thus, in some examples, the back-end platform may extract data from these various data entities for use as input data for one or more of the machine-learning models. Additionally yet, the input data for the machine-learning models may include something other than user-input data for the construction project. For instance, the back-end platform may derive input data for the machine-learning models that is based at least in part on user-input data for the construction data, but that is not user-input data itself.

In any case, when executing each respective machine-learning model of the multiple stages of machine-learning models, the back-end platform may obtain data for a respective set of data variables associated with a given construction project and input the obtained data into the respective machine-learning model for evaluation. In line with the discussion above, each stage's machine-learning model will typically be configured to have a different set of input data variables, such that each machine-learning model evaluates a different set of input data. Upon evaluating its respective set of input data, each machine-learning model may output a respective indication of a set of reference projects that are likely to be similar to the given construction project, and this output may take various forms. As one example, the output of each respective machine-learning model may include a set of project identifiers, each identifier corresponding to a respective reference project in the set of reference projects. As another example, the output of each respective machine-learning model may include historical data for the reference projects, such as data for various parameters of interest, examples of which may include cost data or time data when the parameters of interest include project costs and project completion times. However, in other implementations, the back-end platform may be configured to obtain historical data for the reference projects after execution of the machine-learning model (e.g., by using project identifiers output by the machine-learning model). Other examples are possible as well.

In order to output a respective indication of a set of reference projects that are likely to be similar to the given construction project, each of the multiple machine-learning models may be trained to identify similar construction projects using a respective set of training data. The training data may include historical data for a number of past construction projects (e.g., construction projects that have previously been managed using Procore's construction management software). The training data for the past construction projects may be obtained in various ways, such as by extracting the training data from data associated with the past construction projects that has previously been stored by the back-end platform (e.g., initial data for the project and/or other data entities associated with the project), as described above.

In practice, the training data for each respective model will generally include historical data for at least the same respective set of data variables that is to be used as input for the respective model. And because each machine-learning model is generally configured to receive input data for a different set of data variables, each model may be trained using a different set of training data. In this respect, the sets of training data may be chosen to facilitate using different machine-learning models at different times over the course of the construction project. For instance, a first machine-learning model may be trained using training data that is likely available at the outset of a construction project, such as data identifying the size, location, intended use, and type of construction project, as described above. A second machine-learning model may be trained using training data that might be less likely available at the outset of a project and more likely available after the project has progressed to some intermediate point, such as data extracted from bids, drawings, specifications, schedules, RFIs, contractor submittals, and/or meeting minutes. A third machine-learning model may be trained using training data that is more likely to be available after the project has progressed to some even later point, and so on.

As noted above, the respective sets of data variables used as inputs for the machine-learning models may build from one model to the next, and because the training data for each respective model will include historical data for at least the same respective set of data variables that is to be used as input for the respective model, each subsequent machine-learning model may be trained using training data for a set of data variables that builds on the previous model. For instance, the second model may be trained using training data for all of the data variables used to train the first model, plus training data for additional data variables. And in some examples, subsequent machine-learning models may be trained using training data for an entirely different set of data variables or a combination of training data for some different data variables and training data for some of the same data variables used to train the previous model.

In any case, each machine-learning model may be trained to identify construction projects that are similar to one another based on a set of training data for past construction projects. In this respect, each machine-learning model may be trained using one or more machine-learning techniques, one example of which may take the form of an unsupervised clustering technique (e.g., a k-means clustering technique). Using such a clustering technique, each machine-learning model may be trained to organize past construction projects into separate groups, where each separate group is comprised of past construction projects having sufficiently similar training data for the relevant set of data variables.

Once the multiple machine-learning models have been trained and deployed, the back-end platform may engage in a process for predicting various parameters of a given construction project using the machine-learning models. At a high level, this process may involve predicting the project parameters at each of multiple different times during the course of the given construction project, where the prediction at each time during the course of the given construction project involves (i) obtaining data values for a given set of data variables associated with the given construction project that are to serve as inputs to the stage's machine-learning model, (ii) executing the stage's machine-learning model by inputting the obtained data values into the model and thereby causing the model to identify a set of similar projects, and then (iii) predicting parameters based on the identified set of similar projects.

To illustrate with an example where there are two stages of machine-learning models, the process may involve (i) obtaining data values for a first set of data variables associated with a given construction project, (ii) evaluating the first set of data variables using a first machine-learning model and thereby predicting a first set of reference construction projects that are likely to be similar to the given construction project, (iii) determining a predicted value for at least one parameter of the given construction project based on historical data for the first set of reference construction projects, (iv) thereafter obtaining data values for a second set of data variables associated with the given construction project, (v) evaluating the second set of data variables using a second machine-learning model and thereby predicting a second set of reference construction projects that are likely to be similar to the given construction project, and (vi) determining an updated predicted value for the at least one parameter of the given construction project based on historical data for the second set of reference construction projects. As described in detail below, each of these functions may take various forms.

The back-end platform may use the multi-stage predictive analytics described herein to predict values for any of various different types of parameters of the given construction project. As one possibility, the back-end platform may predict an overall cost of the given construction project based on the overall costs of the reference construction projects in the set of reference projects identified by the applicable model. As another possibility, the back-end platform may predict a time to completion for the given project based on times to completion for the reference construction projects in the set of reference projects identified by the applicable model. The back-end platform may predict values for other types of parameters of the given construction project as well.

Moreover, regardless of the type of parameter being predicted, the back-end platform may use any of various techniques to predict its value based on the identified set of reference projects, including but not limited to statistical techniques. As one example, the back-end platform may determine a single estimated value of a parameter to be a median, mean, or mode value of the corresponding parameter for the reference construction projects in the set of reference projects identified by the applicable model. As another example, the back-end platform may determine a range of estimated values of a parameter, such as some number of standard deviations above or below a mean value of the corresponding parameter for the reference construction projects in the set of reference projects identified by the applicable model. As yet another example, the back-end platform may determine multiple discrete options for the estimated value of a parameter, such as in a scenario where the values of the corresponding parameter are multimodal for the reference construction projects in the set of reference projects identified by the applicable model. The back-end platform may use any combination of these or other various statistical techniques to predict parameter values based on the set of reference projects identified by the applicable model as well.

In some examples, the back-end platform may use a machine-learning technique to predict one or more values of a parameter of interest of the given construction project based on the identified set of similar reference projects. The back-end platform may use data from the identified set of reference projects as training data to train a machine-learning model using a supervised learning technique such as a regression technique (e.g., a linear regression or a polynomial regression) or an artificial neural network technique. When training such a supervised machine-learning model, the back-end platform may use data from the identified set of reference projects corresponding to a parameter of interest as a desired output value (i.e., a supervisory signal), and the back-end platform may use various other data from the identified set of reference projects as input training data. As one example, the back-end platform may use, as the input training data, data for some or all of the same data variables used as inputs when identifying the set of reference projects in the first instance. However, other data may be used as input training data as well. Once the back-end computing platform has trained the model, the back-end platform may then provide, as input data to the supervised machine-learning model, data from the given construction project that corresponds to the data variables used to train the model, and receive, as output data from the model, a predicted value of the parameter of interest for the given construction project.

After predicting one or more parameter values of the given construction project, the back-end platform may cause the predicted one or more parameter values to be presented to a user, which the platform may do in various ways. In the context of a SaaS application, for instance, the back-end platform may send the one or more predicted parameter values to a user's client station along with an instruction to present the one or more predicted parameter values. Based on receiving the one or more predicted parameter values and the instruction, the user's client station may present the predicted parameter values to the user (e.g., via a display of the client station).

As the construction project progresses, and as more data for the construction project becomes available to the back-end platform, the back-end platform may use this additional data to update the one or more predicted parameter values for the construction project. For instance, as the project progresses, the back-end platform may execute one or more additional stages of machine-learning models using the additional available data, and each additional machine-learning model may output an indication of a new set of past construction projects that are most similar to the given construction project. The back-end platform may then update the one or more predicted parameter values based on the new set of similar past construction projects and cause the updated values to be presented to the user. In this manner, as the available data for a given construction project evolves, the back-end platform may occasionally reevaluate which reference projects are most similar to the given construction project, thereby iteratively improving the predicted parameters of the given construction project over its duration.

The software technology disclosed herein may provide various benefits over existing techniques for predicting one or more parameters of a construction project. For instance, the disclosed software technology may improve an accuracy of existing approaches for predicting construction project parameters, as existing approaches may fail to update the predictions over the course of a given construction project as more information about the project becomes available. Further, existing techniques may be less accurate because they may be unable to leverage a large database of reference projects for identifying projects that are sufficiently similar to the given construction project and may instead rely on a more limited universe of prior construction projects. As yet another example benefit, the disclosed software technology may improve an efficiency of predicting project parameters by reducing the amount of time and energy that would otherwise be required for an individual to review historical information for past construction projects to identify those that are similar to a new construction project in order to come up with an accurate determination of which prior projects should be used as the basis for estimating the parameters for the new project.

In accordance with the above, in one aspect, disclosed herein is a method that involves a computing system (i) at a first time: (a) obtaining data values for a first set of data variables associated with a given construction project, (b) inputting the obtained data values for the first set of data variables into a first machine-learning model that functions to (1) evaluate the obtained data values for the first set of data variables and (2) based on the evaluation of the obtained data values for the first set of data variables, output a prediction of a first set of reference construction projects that are likely to be similar to the given construction project, (c) based on historical data for the first set of reference construction projects, determining a predicted value for at least one parameter of the given construction project, and (d) causing the predicted value for the at least one parameter of the given construction project to be presented to at least one user, and (ii) at a second time after the first time: (a) obtaining data values for a second set of data variables associated with the given construction project, wherein the second set of data variables includes at least one data variable that is not included in the first set of data variables, (b) inputting the obtained data values for the second set of data variables into a second machine-learning model that functions to (1) evaluate the obtained data values for the second set of data variables and (2) based on the evaluation of the obtained data values for the second set of data variables, output a prediction of a second set of reference construction projects that are likely to be similar to the given construction project, (c) based on historical data for the second set of reference construction projects, determining an updated predicted value for the at least one parameter of the construction project, and (d) causing the updated predicted value for the at least one parameter of the given construction project to be presented to at least one user.

In another aspect, disclosed herein is a computing system that includes at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable medium comprising program instructions that are executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, the present disclosure generally relates to technology for predicting one or more parameters of a construction project utilizing multiple stages of machine-learning models, which may be incorporated into software for managing construction projects, among other possibilities. For instance, the disclosed technology may be incorporated into a software as a service ("SaaS") application for managing construction projects, which may include back-end software that runs on a back-end computing platform and front-end software that runs on users' client stations (e.g., in the form of a native application, a web application, and/or a hybrid application, etc.) and can be used to access the SaaS application via a data network, such as the Internet. One example of such a SaaS application is the construction management application offered by Procore, which is the assignee of the present application. However, it should be understood that the disclosed technology may also be incorporated into software applications that take other forms as well.

I. EXAMPLE SYSTEM CONFIGURATION

Figure 1:
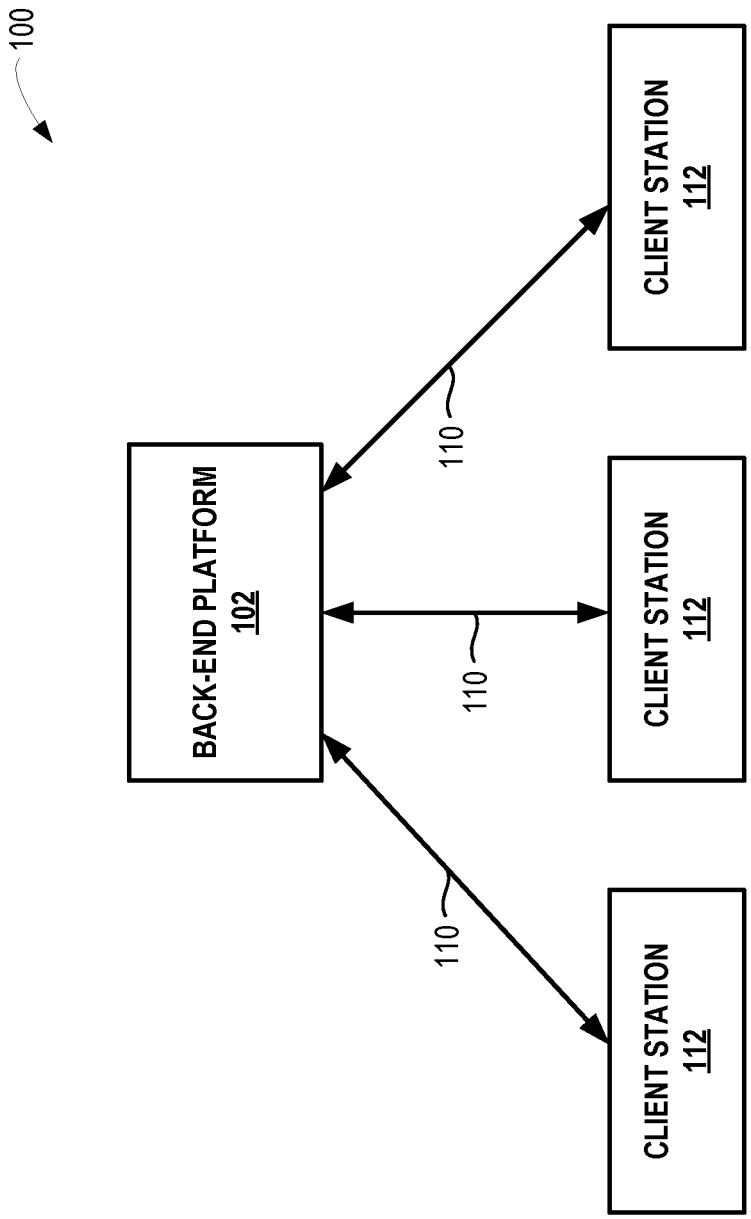
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been installed with back-end software (e.g., program code) for hosting an example SaaS application that incorporates the disclosed technology and delivering it to users over a data network. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS), Google Cloud Platform (GCP), Microsoft Azure, or the like. As another possibility, back-end computing platform 102 may comprise one or more dedicated servers that have been provisioned with software for carrying out one or more of the functions disclosed herein. Other implementations of back-end computing platform 102 are possible as well.

In turn, client stations 112 may each be any computing device that is capable of accessing the SaaS application hosted by back-end computing platform 102. In this respect, client stations 112 may each include hardware components such as a processor, data storage, a communication interface, and user-interface components (or interfaces for connecting thereto), among other possible hardware components, as well as software components that facilitate the client station's ability to access the SaaS application hosted by back-end computing platform 102 and run the front-end software of the SaaS application (e.g., operating system software, web browser software, mobile applications, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

While FIG. 1 shows an arrangement in which three client stations are communicatively coupled to back-end platform 102, it should be understood that this is merely for purposes of illustration and that any number of client stations may communicate with back-end platform 102.

Although not shown in FIG. 1, back-end computing platform 102 may also be configured to interact with other third-party computing platforms, such as third-party computing platforms operated by organizations that have subscribed to the SaaS application and/or third-party computing platforms operated by organizations that provide back-end computing platform 102 with third-party data for use in the SaaS application. Such computing platforms, and the interaction between back-end computing platform 102 and such computing platforms, may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
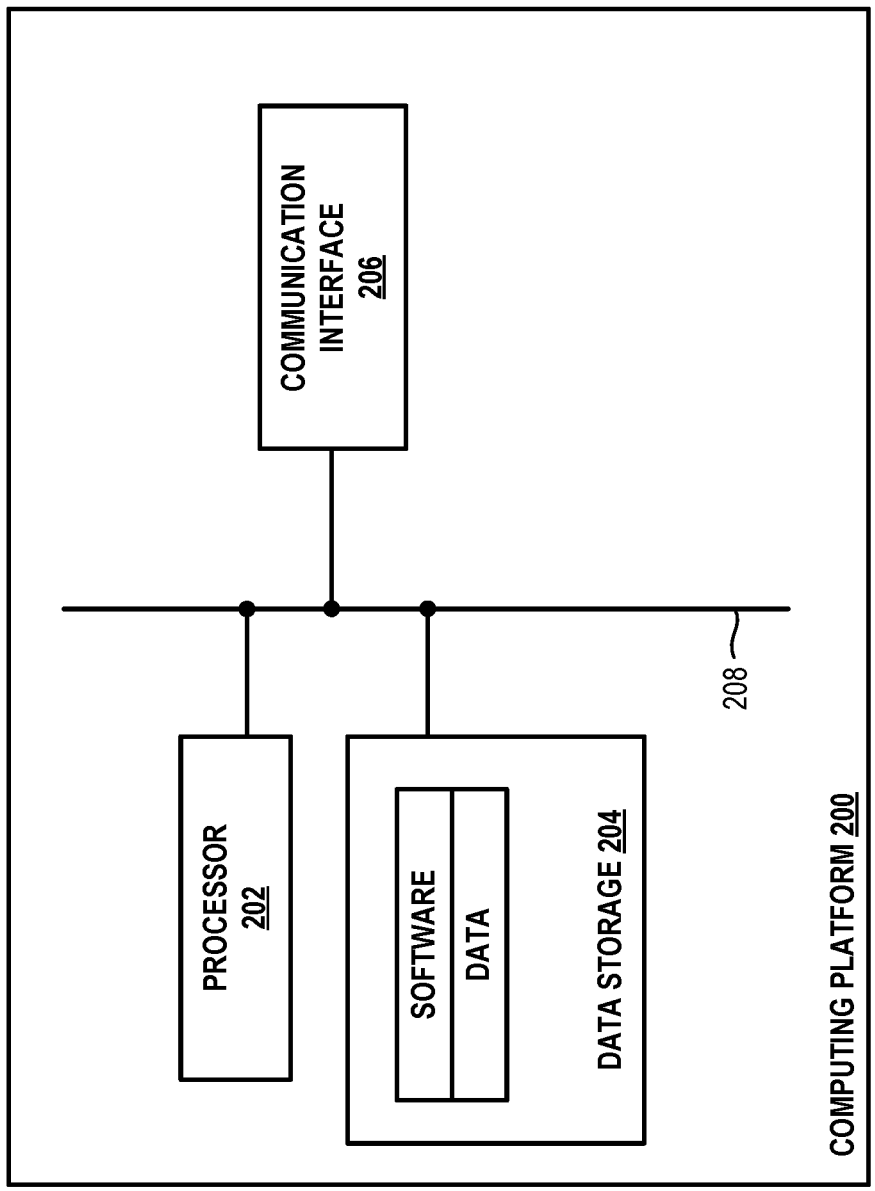
FIG. 2 depicts an example computing platform that may be configured to carry out one or more of the functions according to the disclosed technology.

FIG. 2 is a simplified block diagram illustrating some structural components that may be included in an example computing platform 200, which could serve as, for instance, the back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the disclosed functions, which may be arranged together into engineering artifacts or the like, and (ii) data that may be received, derived, or otherwise stored, for example, in one or more databases, file systems, or the like, by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with client stations (e.g., one or more client stations 112 of FIG. 1) and/or third-party computing platform. Additionally, in an implementation where computing platform 200 comprises a plurality of physical computing systems connected via a network, communication interface 206 may be configured to facilitate wireless and/or wired communication between these physical computing systems (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication. Communication interface 206 may also include multiple communication interfaces of different types. Other configurations are possible as well.

Although not shown, computing platform 200 may additionally include or have an interface for connecting to user-interface components that facilitate user interaction with computing system 200, such as a keyboard, a mouse, a trackpad, a display screen, a touch-sensitive interface, a stylus, a virtual-reality headset, and/or speakers, among other possibilities.

It should be understood that computing platform 200 is one example of a computing system that may be used with the embodiments described herein. Numerous other arrangements are possible and contemplated herein. For instance, other computing systems may include additional components not pictured and/or more or fewer of the pictured components.

III. EXAMPLE OPERATIONS

As mentioned above, the present disclosure generally relates to technology for predicting one or more parameters of a construction project (also referred to herein as the "subject construction project"), such as an estimated cost of all or a portion of the project and/or an estimated time to complete all or a portion of the project. To facilitate predicting such parameters, the technology disclosed herein employs multiple stages of machine-learning models that are to be executed at different times during the course of the subject construction project. Each machine-learning model is configured to predict a set of past construction projects that are likely similar to the subject construction project based on a different set of features for the subject construction project for which data is expected to be available at a different time during the course of the project. Then, at each stage, once the similar past construction projects have been identified, historical parameter information for the past construction projects is used to predict corresponding parameters of the subject construction project.

As further mentioned above, the multi-stage predictive analytics described herein can be carried out using a back-end computing platform, such as back-end platform 102 of FIG. 1, that is hosting a construction management SaaS application like Procore's construction management software application. For instance, Procore's SaaS application includes front-end software running on users' client stations and back-end software running on a back-end computing platform that is accessible to the client stations via a data network, such as the Internet. Using Procore's SaaS application, a user may input information about the subject construction project through a client station running the front-end software, and this then results in corresponding data about the project being received by the back-end platform, typically by virtue of the client station sending the data to the back-end platform via the Internet, and then stored by the back-end platform for future access. The back-end platform may then use some or all of this data when executing the multiple stages of machine-learning models, as explained in further detail below.

Figure 3:
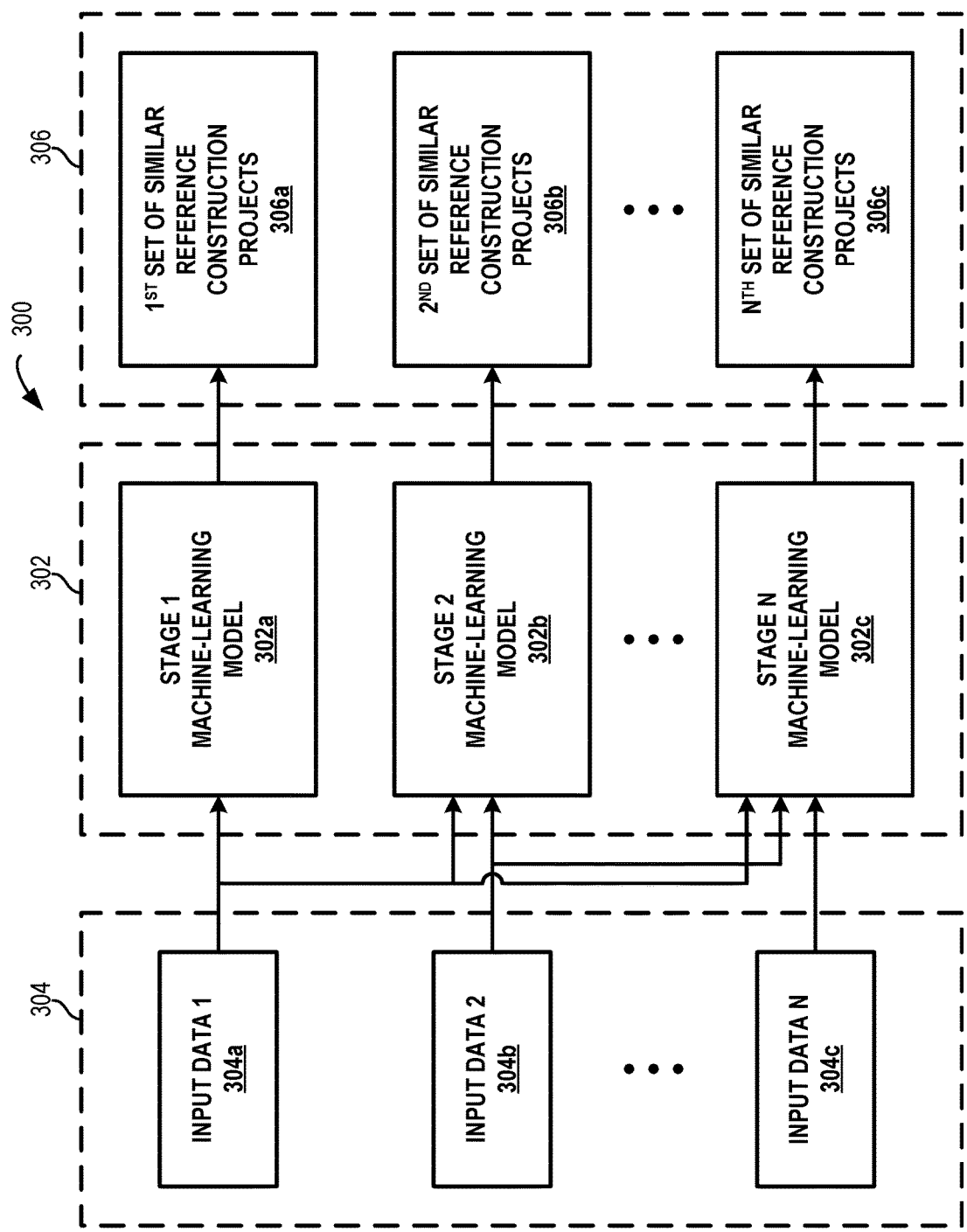
FIG. 3 depicts an example data flow diagram for a machine-learning system comprising multiple stages of machine-learning models.

FIG. 3 depicts an example data flow diagram 300 for the multi-stage predictive analytics described herein. As noted above, the multi-stage predictive analytics comprises multiple stages of machine-learning models 302, including at least a first machine-learning model 302a at a first stage and a second machine-learning model 302b at a second stage. Further, the predictive analytics may comprise any number of additional machine-learning models, including a number of models up to an Nth machine-learning model 302c at an Nth stage, where N is a positive integer.

The machine-learning models 302 may be configured to receive input data 304. As shown, the input data 304 received by the models 302 varies at each stage. For instance, the first machine-learning model 302a at the first stage receives a first set of input data 304a, the second machine-learning model 302b at the second stage receives a second set of input data 304b, and the Nth machine-learning model 302c at the Nth stage receives an Nth set of input data 304c. As further shown, the input data 304 received by each stage's machine-learning model 302 may build on the input data 304 received at a previous stage. For instance, the second machine-learning model 302b may receive some or all of the first set of input data 304a in addition to the second set of input data 304b. Likewise, the Nth machine-learning model 302c (and any machine-learning model between the second machine-learning model 302b and the Nth machine-learning model 302c) may receive some or all of any of the input data 304 received by one or more of the machine-learning models 302 at previous stages. However, there may be examples where the input data 304 for one or more of the machine-learning models 302 excludes some or all of the input data 304 that was received by one or more of the previous machine-learning models 302. And in some examples, one or more of the machine-learning models 302 may receive input data 304 that is entirely distinct from input data 304 that was received by one or more of the previous machine-learning models 302.

Each respective set of input data 304 may include data for a respective set of data variables that indicate a respective set of features for the subject construction project. The data variables for a given set of input data 304 may correspond to features for which data is expected to be available at a given time during the course of the subject construction project. For instance, the first set of input data 304a may include data that is expected to be available at a first time that is early in the subject construction project, such as at the outset of the project or when a user first creates the project using the construction management software application. Likewise, the second set of input data 304b may include data that might be less likely available at the outset of the subject construction project and more likely available after the project has progressed to some intermediate point. This trend may continue all the way up to the Nth set of input data 304c with each subsequent set of input data including data that is more likely to be available after the project has progressed to some even later point.

Each of the respective machine-learning models 302 is configured to evaluate its respective input data 304 and, based on the evaluation, provides respective output data 306. For instance, the first machine-learning model 302a may evaluate the first set of input data 304a and, based on the evaluation, provide a first set of output data 306a. The second machine-learning model 302b may evaluate the second set of input data 304b (and any of the first set of input data 304a that is also provided to the second machine-learning model 302b) and, based on the evaluation, provide a second set of output data 306b. And the Nth machine-learning model 302c may evaluate the Nth set of input data 304c (and any data from the previous sets of input data 304 that is also provided to the Nth machine-learning model 302c) and, based on the evaluation, provide an Nth set of output data 306c.

The output data 306 at each stage may indicate a respective set of past construction projects (also referred to herein as "reference construction projects") that are likely similar to the subject construction project. For instance, the first set of output data 306a may indicate a first set of reference construction projects that are likely similar to the subject construction project, the second set of output data 306b may indicate a second set of reference construction projects that are likely similar to the subject construction project, and the Nth set of output data 306c may indicate an Nth set of reference construction projects that are likely similar to the subject construction project.

In practice, the machine-learning models 302 may be created by a back-end computing platform, which may be, for example, back-end computing platform 102 of FIG. 1 or some other back-end computing platform. The process of creating the machine-learning models 302 that each apply predictive analytics to predict a respective set of past construction projects that are likely similar to the subject construction project may take any of various forms. As one possibility, the machine-learning models 302 may each be trained using a machine-learning technique such as an unsupervised clustering technique (e.g., a k-means clustering technique). However, other machine-learning techniques may be used as well.

Figure 4:
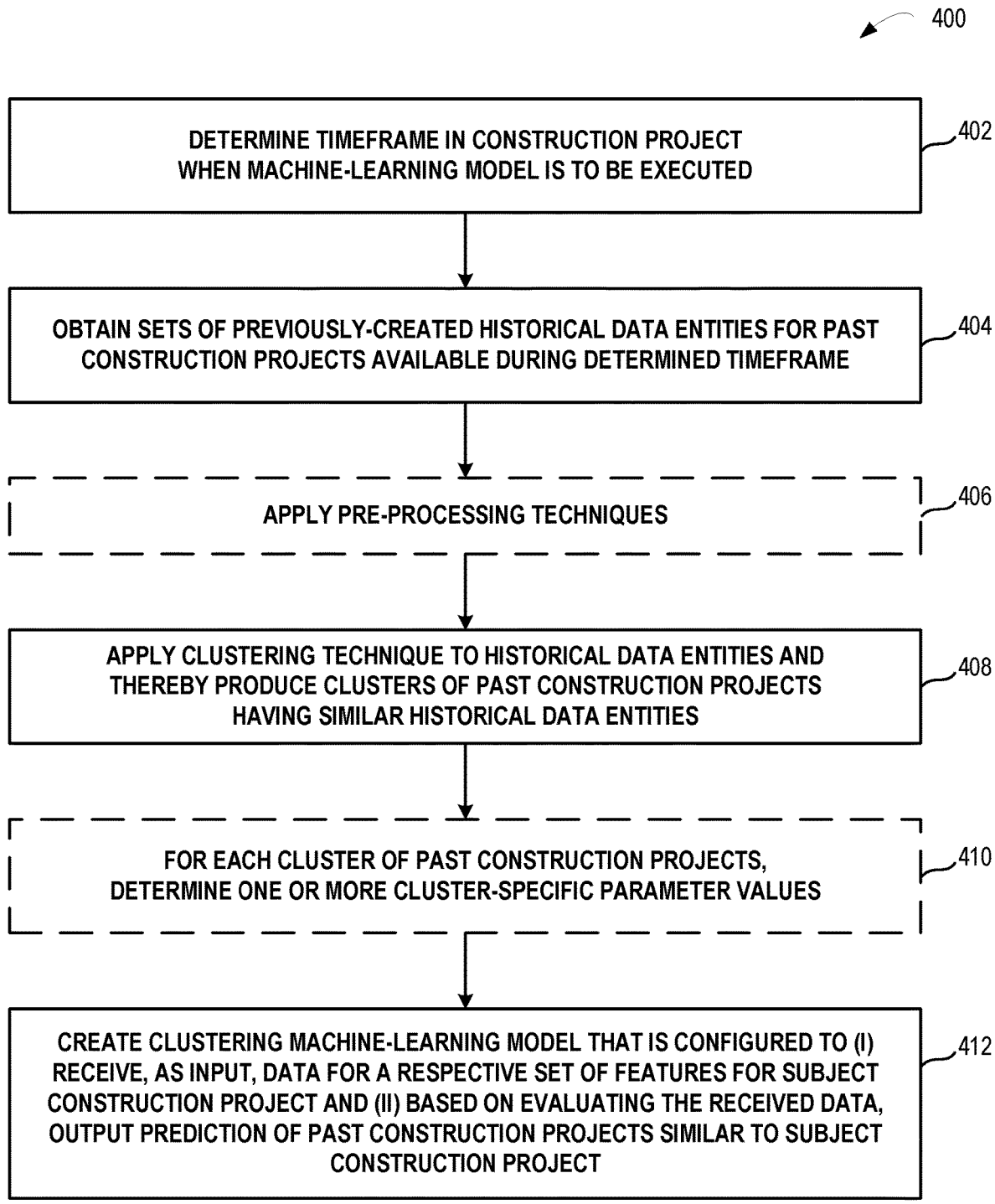
FIG. 4 depicts an example process for creating multiple stages of machine-learning models that may be utilized to predict one or more parameters of a construction project.

FIG. 4 illustrates one possible example of a process 400 for creating training data sets for the machine-learning models 302. The example process 400 may be carried out separately for each of the respective machine-learning models 302. The example process 400 may begin at block 402, where the back-end computing platform may determine a timeframe in a construction project when the machine-learning model being trained is to be executed. In line with the discussion above, different ones of the machine-learning models 302 may be executed at different times during the course of a construction project and may evaluate different input data 304 that is likely available at different times during the course of the construction project. Thus, when training a given one of the machine-learning models 302 according to the example process 400, the back-end platform may determine an intended timeframe in the course of the construction project when the machine-learning model 302 is to be executed so that the back-end platform may train the machine-learning model 302 using training data available during that timeframe.

In some examples, the back-end platform may determine the intended timeframe of a given one of the machine-learning models 302 in various ways. As one possibility, the back-end platform may determine the intended timeframe based on user input. For instance, a data scientist tasked with creating the machine-learning models 302 may specify an intended timeframe for each of the machine-learning models 302. As another possibility, the back-end platform may determine the intended timeframe based on an analysis of past construction projects. For instance, the back-end platform may perform a time-based analysis of data from past construction projects to determine the kinds of data typically available at different times during a project and define the intended timeframes for each of the machine-learning models 302 based on when new kinds of data typically become available for the past construction projects.

The specified timeframes may take various forms. In some examples, the specified timeframes may correspond to an elapsed time during the course of the construction project, such as a number of days, weeks, or months after creation of the project. In other examples, the specified timeframes may correspond to phases of the construction project. During the course of a construction project, the back-end platform may be configured to store phase status data corresponding to a current phase of the project, which may be specified through user input. Examples of phases of a construction project may include a bidding phase where contractors submit bids for performing various aspects of the project, a design phase where architects design the overall shape and layout of the construction project, a planning phase where engineers design various portions of the project's infrastructure and produce engineering drawings and plans based on the architectural and engineering designs, a logistics phase where contractors review these plans and begin to allocate various resources to the project, a construction phase where construction professionals begin to construct the project based on the finalized plans, and a post-construction phase where managers or other construction professionals perform a project closeout process including identifying any punch list items, completing inspections, cleaning the job site, and organizing relevant documents for transfer to the owner of the job site. As such, the specified timeframe for each of the machine-learning models 302 may correspond to one or more of these project phases.

At block 404, once the back-end platform has determined the intended timeframe when the machine-learning model is to be executed, the back-end platform may obtain historical data entities that have been previously created and stored for a collection of past construction projects. In particular, the back-end platform may obtain a separate set of historical data entities for each respective past construction project, and each set of historical data entities may include historical data entities that were available during the determined timeframe. To illustrate, consider an example in which the machine-learning model being trained is the first machine-learning model 302a, and the intended timeframe for execution of the first machine-learning model 302a is at (or shortly after) the time of creation of a construction project. In this example, the back-end platform may obtain, for each past construction project in the collection of past construction projects, a respective set of historical data entities that were available at (or shortly after) the time of creation of the past construction project. And when training other machine-learning models having different intended timeframes for execution, the back-end platform may similarly obtain historical data entities for the past construction projects that were available during these different intended timeframes.

The historical data entities may take various forms, including any of the data entities previously discussed herein. For instance, the historical data entities may include user input data provided by a user as part of the creation process of the past construction project. As noted above, examples of such user input data may include (i) data indicating a physical size of the construction project, such as an area (e.g., a square footage) of a building or property associated with the project or a number of floors of a building associated with the project, (ii) data indicating a location of the construction project, such as a zip code, a city, a county, a state, a nation, or an indication of whether the project is located in an urban, suburban, or rural area, (iii) data indicating an intended use of the construction project, such as an occupancy classification specifying whether the construction project was for residential, industrial, business, or educational use, to name a few, or (iv) data indicating a type of construction performed in connection with the construction project, such as whether the construction project involved new construction versus renovation of an existing building, or if the construction involved or was limited to a particular infrastructure subsystem, such as HVAC, plumbing, or electrical, to name a few.

In some examples, some or all of the historical data entities may have been previously created by the back-end computing platform through use of a construction management software application hosted by the platform. With respect to Procore's software application, for instance, a user may access various tools for managing a construction project and may use these tools to create various data entities. Some non-limiting examples of such tools may include a "Bidding" tool where a user may enter bidding data for creating, submitting, reviewing, or accepting a bid for the construction project, a "Drawings" tool where a user may enter drawing data to upload, view, or markup drawing files for the construction project, a "Specifications" tool where a user may enter specification data for the construction project, a "Schedule" tool where a user may enter scheduling data for the construction project, a Request for Information ("RFI") tool where a user may enter RFI data for the construction project to request and/or provide information about given project tasks, a "Submittals" tool where a user may enter contractor submittal data for the construction project to create or respond to a contractor submittal, a "Meetings" tool where a user may enter meetings data that enables the user to manage meetings (e.g., schedule meetings, select attendees, attach reference materials, create meeting agendas, create meeting minutes, etc.), an "Inspections" tool where a user may enter inspections data items for the construction project that capture requirements associated with different types of inspections for the construction project (e.g., safety inspection), an "Observations" tool where a user may enter observation data items for the construction project that memorialize observations made during on-site inspections of the construction project, a "Punch Lists" tool where a user may enter punch lists data for the construction project that memorialize punch items on the construction project, an "Emails" tool where a user may perform basic email functions (e.g., send, reply, forward, etc.) to communicate with one or more parties involved in the construction project, a "Correspondence" tool where a user may enter correspondence data that enables correspondence with one or more parties regarding certain aspects of the construction project (e.g., status updates, notices of delay, extensions of time, etc.), or an "Instructions" tool where a user may enter instruction data that memorializes various types of instructions (e.g., architect instructions, site instructions, etc.) for the construction project. The set of historical data entities may include any of the data received by the back-end platform through any of these construction management tools, so long as the historical data entities were available in the past construction project during the intended timeframe for execution of the machine-learning model.

At block 406, the back-end computing platform may optionally pre-process the data included within the set of previously-created historical data entities so as to increase the suitability of the data and/or determine one or more features of the data for use as training data for the machine-learning model. As one example, pre-processing may take the form of Natural Language Processing ("NLP") techniques that analyze user-inputted data in a way that enables the back-end platform to better "understand" the overall context of the data. Such NLP techniques may include, as some nonlimiting examples, identifying and extracting keywords and/or key features from the raw text included in user-input data, correcting any spelling and/or grammatical errors, unification, non-ascii character removal, stop word removal, lemmatization, and sentiment analysis.

After obtaining the sets of previously-created historical data entities from past construction projects and optionally pre-processing data included within the sets of historical data entities, the back-end computing platform may use the sets of historical data entities as a training dataset for a machine-learning process that functions to train a machine-learning model that is configured to (i) receive, as input, data for a respective set of data variables that indicate a respective set of features for a construction project, (ii) evaluate the received data for the respective set of data variables, and (iii) based on the evaluation, predict a set of past construction projects that have a sufficient level of similarity to the given construction project based on the respective set of data variables. The machine-learning process may take various forms and may, for example, include using a clustering technique, as explained below in connection with block 408.

At block 408, the back-end platform may apply a clustering technique (or sometimes referred to as a cluster analysis), such as a k-means clustering technique, that clusters the sets of historical data entities based on one or more features included or associated with the sets of historical data entities, such that the sets of historical data entities in each respective cluster have similar features to one another. For example, some sets of historical data entities may have been clustered together in one cluster based at least in part on the sets of historical data entities comprising historical data entities that identify a similar physical construction project size (e.g., a similar square footage). As another example, some sets of historical data entities may have been clustered together in one cluster based at least in part on the sets of historical data entities comprising historical data entities that identify a similar construction project type (e.g., new build versus renovation). As yet another example, some sets of historical data entities may have been clustered together in one cluster based at least in part on the sets of historical data entities comprising historical data entities that identify similar keywords in a construction project description (e.g., "school," "condominium," "gymnasium," etc.). Sets of historical data entities may be clustered together based on combinations of these and other similar characteristics as well.

By clustering the sets of historical data entities in this way, the back-end platform may thereby produce clusters of past construction projects having similar sets of historical data entities. As noted above, each set of historical data entities corresponds to a different respective past construction project. When obtaining the sets of historical data entities at block 404, the back-end platform may associate each set with a project identifier of its corresponding past construction project. As such, when clustering the sets of historical data entities based on their similarities, the back-end platform is effectively clustering the past construction projects based on the past construction projects having similar sets of historical data entities.

At block 410, the back-end computing platform may optionally, for each cluster of past construction projects, determine one or more cluster-specific parameter values. These values may be used to predict corresponding parameter values in other construction projects, as explained in further detail below, so the parameters may be chosen as parameters that might be desirable for prediction, such as a cost of at least a portion of a project or a time of completion for at least a portion of a project.

When determining the one or more cluster-specific parameter values, the back-end computing platform may access data associated with each past construction project in a given cluster. As noted above, the past construction projects may be projects managed through a construction management software hosted by the back-end platform such that the back-end platform includes, or otherwise has access to, data storage where the data entities of the past projects are stored. The back-end platform may thus access the data entities of the past projects in a given cluster and determine a value of a parameter of interest for each of the past projects in the given cluster.

In order to determine the cluster-specific parameter values, the back-end platform may apply a statistical analysis to the determined parameter values for each of the past projects. As one example, the back-end platform may determine a single value of the cluster-specific parameter to be a median, mean, or mode value of the determined parameter values for the past projects in the given cluster. As another example, the back-end platform may determine a range of values of the cluster-specific parameter, such as some number of standard deviations above or below a mean value of the determined parameter values for the past projects in the given cluster. As yet another example, the back-end platform may determine multiple discrete options for the value of the cluster-specific parameter, such as in a scenario where the determined parameter values for the past projects in the given cluster are multimodal. The back-end platform may use any of other various statistical techniques to determine the cluster-specific parameter values as well.

At block 412, after applying clustering techniques such as those described above, the back-end computing platform may then embody the clusters (and optionally the determined cluster-specific parameter values) into a machine-learning model that functions to (i) receive, as input, data that is available for a respective set of data variables that indicate a respective set of features for a subject construction project and (ii) based on an evaluation of the received data for the respective set of data variables, outputting a prediction of one or more past construction projects that have a sufficient level of similarity to the subject construction project (e.g., past construction projects having similar values for the respective set of data variables).

As noted above, the training process depicted by FIG. 4 may be used when training each machine-learning model in the multiple stages of machine-learning models 302. However, the training data (e.g., the historical data entities obtained from the past construction projects) obtained for training each model will vary from model to model based on the intended timeframe for execution of the model and the data variables for which data is expected to be available during the intended timeframe, as further described above.

Once each of the multiple stages of machine-learning models 302 have been trained, the back-end computing platform may use the machine-learning models 302 to predict clusters of past construction projects (also referred to herein as sets of "reference construction projects") that are sufficiently similar to a subject construction project. Then, based on the predicted similar reference construction projects, the back-end platform may determine a predicted value for one or more parameters of the subject construction project.

Figure 5:
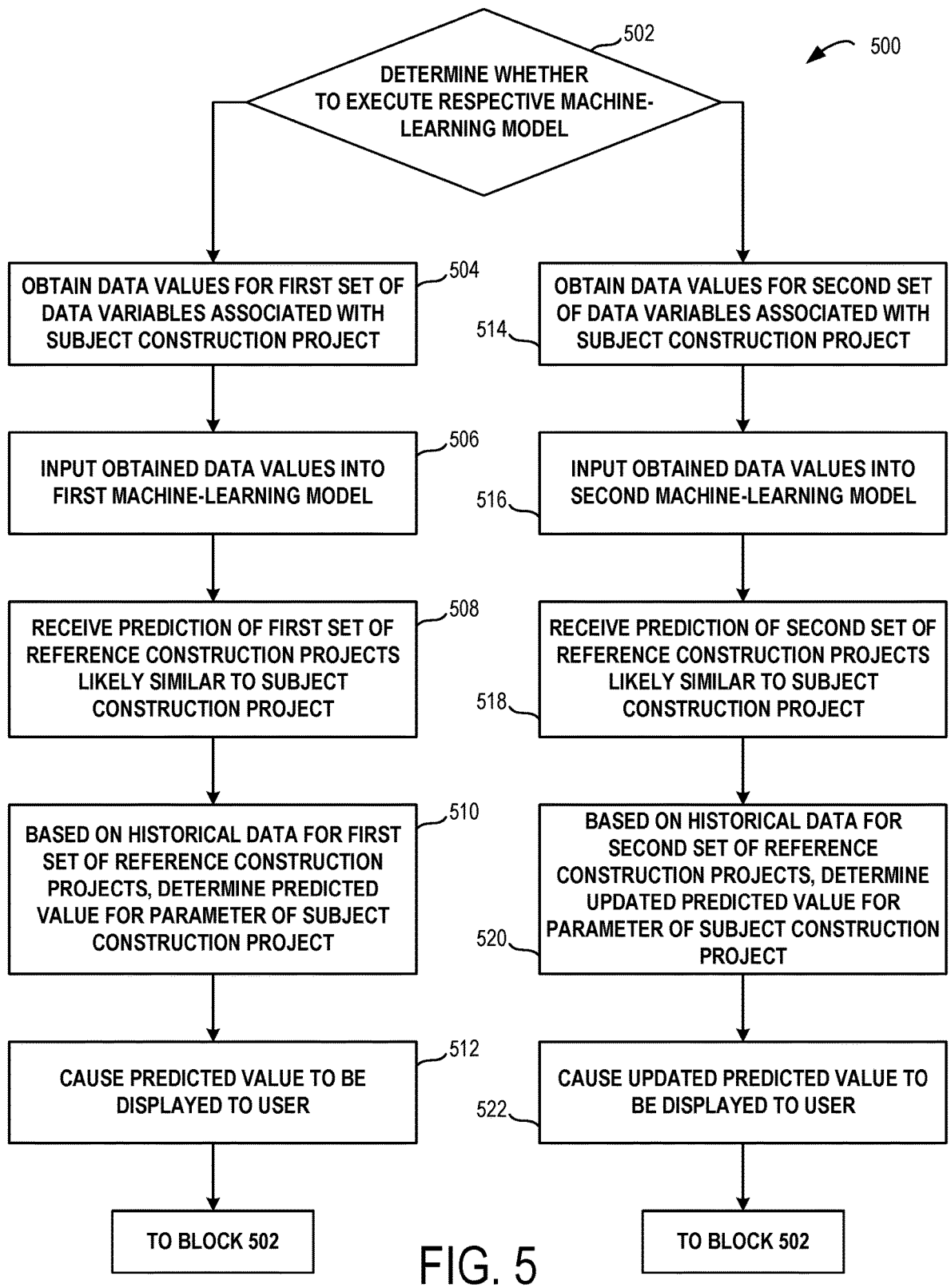
FIG. 5 depicts an example process for utilizing multiple stages of machine-learning models to predict one or more parameters of a construction project.

Turning now to FIG. 5, an example process 500 is depicted for using the machine-learning models 302 to predict reference projects that are similar to a subject construction project and, based on the similar reference projects, determine a predicted value for one or more parameters of the subject construction project. In line with the discussion above, the example process 500 may involve using multiple stages of machine-learning models at different times during the course of the construction project. This may allow for determining the predicted value for the one or more parameters at a first time and then updating the predicted value at one or more later times as additional data becomes available in connection with the subject construction project. The example process 500 may begin at block 502, where the back-end computing platform may make a determination of whether to execute one of the multiple stages of machine-learning models 302.

As one possibility, the determination at block 502 may involve determining current time or phase information of the subject construction project. In some examples, determining the current time information of the project may involve determining when the subject construction project is created and/or determining an elapsed time of the subject construction project, such as a number of days, weeks, or months after creation of the project. In other examples, determining the current phase information of the project may involve accessing phase status data associated with the project that specifies a phase of the project (e.g., a bidding phase, a design phase, a planning phase, a logistics phase, a construction phase, or a post-construction phase) and determining the current phase of the project based on the phase status data.

As another possibility, the determination at block 502 may involve determining that a sufficient amount of data associated with the subject construction project is available for use as input data to one or more of the machine-learning models 302. As described above in connection with FIG. 4, each of the machine-learning models 302 may be trained using a different set of historical data that was available at different times during the past construction project, such that each of the machine-learning models 302 is configured to receive input data for a different set of data variables corresponding to the types of historical data used to train the model. As such, for a given one of the machine-learning models 302, the back-end platform may identify the set of data variables that the model is configured to receive as input, and the back-end platform may access the data associated with the subject construction project to determine whether the data associated with the subject construction project includes data for each data variable in the identified set of data variables.

As yet another possibility, the determination at block 502 may be based on user input. For instance, the back-end platform may receive an instruction to execute one of the machine-learning models 302 based on user input provided via a user's client station.

Based on the determination at block 502, the back-end platform may proceed to block 504 to execute a first one of the machine-learning models 302. As one example, based on the determined current time or phase information of the subject construction project, the back-end computing platform may execute a first one of the machine-learning models that has an intended timeframe for execution that aligns with the current time or phase information of the subject construction project. As another example, based on determining that a sufficient amount of data associated with the subject construction project is available for use as input data to a first one of the machine-learning models 302, the back-end platform may execute that first model. As yet another example, based on receiving an instruction to execute a first one of the machine-learning models 302, the back-end platform may execute that first model.

At block 504, the back-end computing platform may obtain data values for a first set of data variables associated with the subject construction project, where the data values for the first set of data variables will serve as input data for a first machine-learning model (e.g., first machine-learning model 302a) from among the multiple stages of machine-learning models 302. The back-end computing platform may obtain the data values for the first set of data variables in the same or similar way as the back-end platform obtained the historical data entities used to train the first machine-learning model, as described above. For instance, the back-end computing platform may obtain the data values for the first set of data variables based on user input data and/or based on data entities created through use of one or more tools provided by the construction management software hosted by the back-end platform. Further, while not shown in FIG. 5, the back-end computing platform may optionally apply any of the pre-processing techniques described above in connection with FIG. 4 to the obtained data so as to increase the suitability of the data and/or determine one or more features of the data for use as data values for the first set of data variables.

At block 506, the back-end computing platform may input the obtained data values for the first set of data variables into the first machine-learning model. As described above, the first machine-learning model functions to (i) evaluate the obtained data values for the first set of data variables and (ii) based on the evaluation of the obtained data values for the first set of data variables, output a prediction of a first set of reference construction projects that are likely to be similar to the subject construction project. As used herein, the first set of reference construction projects is "likely to be similar" to the subject construction project if the first machine-learning model clusters the subject construction project with the first set of reference construction projects based on similarities between the data values for the first set of data variables and the respective sets of historical data entities for the reference construction projects in the first set of reference construction projects. Similarly, any set of reference projects is "likely to be similar" to the subject construction project if any of the machine-learning models described herein clusters the subject construction project with the set of reference construction projects based on similarities between the data values for the first set of data variables and the respective sets of historical data entities for the reference construction projects.

At block 508, the back-end computing platform may receive, as output data from the first machine-learning model, the prediction of the first set of reference construction projects that are likely to be similar to the subject construction project. In some examples, the back-end platform may receive respective project identifiers for each reference construction project in the first set of reference construction projects. The project identifiers may take various forms. In some examples, the project identifiers may include an alphanumeric string, such as a serial number, that distinguishes each reference construction project from one another. The back-end platform may have previously stored the project identifiers in connection with the reference construction project in a data storage of the back-end platform, such that when the back-end platform receives the project identifiers for each reference construction project in the first set of reference construction projects, the back-end platform may use the project identifiers to locate in the data storage historical data associated with each reference construction project in the first set of reference construction projects.

At block 510, the back-end computing platform may determine, based on historical data for the first set of reference construction projects, a predicted value for one or more parameters of the subject construction project. As noted above, the one or more parameters may include any parameter of interest, such as a cost of all or a portion of the subject construction project or a time to completion for all or a portion of the subject construction project. In examples where the back-end platform has already determined cluster-specific parameter values for each cluster of past construction projects (i.e., each set of reference construction projects), the back-end platform may determine the predicted value to be one of the cluster-specific parameter values for the first set of reference construction projects. In other examples, the back-end platform may determine the predicted value by applying any of the statistical techniques described above in connection with FIG. 4 to the historical data for the first set of reference projects.

In some examples, the back-end platform may apply a machine-learning technique to determine a predicted value for a parameter of the subject construction project. For instance, the back-end platform may apply a supervised machine-learning technique, such as a regression technique (e.g., a linear regression or a polynomial regression) or an artificial neural network technique, to the cluster-specific parameter values for the first set of reference construction projects in order to train a supervised machine-learning model. The back-end platform may train such a supervised machine-learning model by using the cluster-specific parameter values for the first set of reference construction projects as examples of desired output values (i.e., supervisory signals) for the model, and the back-end platform may use various other data from the first set of reference construction projects as input training data for the model. As one example, the back-end platform may use, as the input training data, data for some or all of the same data variables used as inputs to the first machine-learning model when identifying the first set of reference construction projects. However, other data may be used as input training data as well. Once the back-end computing platform has trained the model, the back-end platform may then provide, as input data to the supervised machine-learning model, data from the subject construction project that corresponds to the data variables used to train the model, and receive, as output data from the model, a predicted value of the parameter of interest for the subject construction project.

Further, in some examples, in addition to determining a predicted value for one or more parameters of the subject construction project, the back-end platform may be configured to, at any given stage of the multiple stages of machine-learning models, determine a set of data variables for which corresponding data values could potentially allow for a more accurate determination of the predicted parameter value and cause an indication of those data variables to be displayed to a user via the user's client station. The user may then provide data values for those data variables to the back-end platform via the user's client station so the back-end platform may use the data values for those data variables to determine an updated (and potentially more accurate) predicted parameter value.

As one example, the back-end platform may identify a difference between sets of data variables used as inputs between consecutive stages of the machine-learning models. For instance, if the first machine-learning model is configured to receive input data for a first set of data variables, and the second machine-learning model is configured to receive input data for a second set of data variables, then the back-end platform may determine a difference in data variables between the first and second sets of data variables. If the back-end platform has already executed the first machine-learning model but has yet to execute the second machine-learning model, then this difference in data variables may indicate the data variables for which the back-end platform must receive data before the back-end platform may execute the second machine-learning model. The back-end platform may then cause a client station of a user to display an indication of the difference in data variables so that the user may provide the corresponding data and the back-end platform may proceed to execute the second machine-learning model.

As another example, the back-end platform may train each of the respective machine-learning models to output an indication of a set of data variables for which corresponding data values could potentially allow for a more accurate determination of the predicted parameter value. For instance, the back-end platform may train the machine-learning models to do so as part of the training process described above in connection with FIG. 4. In addition to training the machine-learning models to cluster the reference projects based on each cluster having particular similar features, the back-end platform may train the machine-learning models to output an indication of features that are dissimilar between reference projects within a given cluster. In such an arrangement, when one machine-learning model outputs an indication of a cluster of reference projects as well as an indication of dissimilar features between the reference projects in the cluster, then the back-end platform may cause a user's client station to display an indication of the dissimilar features, a user may provide data for those dissimilar features to the back-end platform via the user's client station, and a subsequent machine-learning model may use the data for those dissimilar features as input data to further narrow down the number of clustered reference projects to a smaller set that more accurately reflects the features of the subject construction project.

At block 512, the back-end platform may cause the predicted value for one or more parameters of the subject construction project to be displayed to at least one user. For instance, the back-end platform may send the predicted value to a client station of a user along with an instruction that causes the client station to display the predicted value.

After block 512, the example process 500 may return to block 502, where the back-end platform may again determine whether to execute any additional machine-learning models of the multiple stages of machine-learning models 302. For instance, after returning to block 502, the back-end platform may determine to execute a second machine-learning model (e.g., second machine-learning model 302b) from among the multiple stages of machine-learning models 302. The back-end platform may make this determination in the same or similar manner as described above when determining to execute the first machine-learning model. For instance, the back-end platform may determine to execute the second machine-learning model based on (i) determining that a current time or phase of the subject construction project aligns with an intended timeline for execution of the second machine-learning model, (ii) determining that a sufficient amount of data associated with the subject construction project is available for use as input data for the second machine-learning model, or (iii) receiving an instruction to execute the second machine-learning model.

After making the determination to execute the second machine-learning model, the back-end platform may execute the second machine-learning model for purposes of updating the predicted value of the one or more parameters, and the back-end platform may do so in a manner that is similar to execution of the first machine-learning model.

At block 514, the back-end platform may obtain data values for a second set of data variables associated with the subject construction project, where the data values for the second set of data variables will serve as input data for the second machine-learning model. The back-end computing platform may obtain the data values for the second set of data variables in the same or similar way as the back-end platform obtained the historical data entities used to train the second machine-learning model, as described above. For instance, the back-end computing platform may obtain the data values for the second set of data variables based on user input data and/or based on data entities created through use of one or more tools provided by the construction management software hosted by the back-end platform. Further, while not shown in FIG. 5, the back-end computing platform may optionally apply any of the pre-processing techniques described above in connection with FIG. 4 to the obtained data so as to increase the suitability of the data and/or determine one or more features of the data for use as data values for the second set of data variables.

At block 516, the back-end computing platform may input the obtained data values for the second set of data variables into the second machine-learning model. As described above, the second machine-learning model functions to (i) evaluate the obtained data values for the second set of data variables and (ii) based on the evaluation of the obtained data values for the second set of data variables, output a prediction of a second set of reference construction projects that are likely to be similar to the subject construction project. And at block 518, the back-end computing platform may receive, as output data from the second machine-learning model, the prediction of the second set of reference construction projects that are likely to be similar to the subject construction project.

At block 520, the back-end computing platform may determine, based on historical data for the second set of reference construction projects, an updated predicted value for the one or more parameters of the subject construction project. In examples where the back-end platform has already determined cluster-specific parameter values for each cluster of past construction projects (i.e., each set of reference construction projects), the back-end platform may determine the updated predicted value to be one of the cluster-specific parameter values for the second set of reference construction projects. In other examples, the back-end platform may determine the updated predicted value by applying any of the statistical or machine-learning techniques described above in connection with FIG. 4 to the historical data for the second set of reference projects.

At block 522, the back-end platform may cause the updated predicted value to be displayed to at least one user. For instance, the back-end platform may send the updated predicted value to a client station of a user along with an instruction that causes the client station to display the updated predicted value.

After block 522, the example process 500 may return to block 502, where the back-end platform may yet again determine whether to execute any additional machine-learning models of the multiple stages of machine-learning models 302. While the examples described herein focus on the use of two machine-learning models, this process can be carried out an additional one or more times in connection with an additional one or more machine-learning models.

Further, while the examples described above refer to estimating values for a project cost parameter or a time-to-completion parameter, the techniques described herein may be used to estimate values for various other project parameters as well. One such example may involve using the disclosed techniques to predict a number of RFIs, submittals, or other events that have corresponding data entities stored in association with a construction project. Other examples may involve using the disclosed techniques to identify a particular trade or location that is associated with an increased number of RFIs for a project relative to other trades or locations. Other examples may involve using the disclosed techniques to identify one or more types of submittals that are likely to be required in connection with a project, one or more trades that are likely to be used in connection with a project, or one or more complications that are likely to arise in connection with a project. Still other examples may involve using the disclosed techniques to predict when various events or phases of a project are likely to occur and then use that information to generate a predicted schedule of events or phases for the subject project.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed operations for training and utilizing machine-learning models in the manner described herein to cluster projects based on their similar features and using the clustered projects to predict parameter values of another similar project may not be limited to only construction projects. Rather, the disclosed operations could be used in other contexts in connection with other types of projects as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
at least one processor;
a non-transitory computer-readable medium; and
program instructions stored on the non-transitory computer-readable medium that are executable by the at least one processor such that the computing platform is configured to:
train a first-machine learning model by carrying out a first machine learning process on a first training data set that includes historical data for a first timeframe associated with a first set of reference construction projects, the first machine learning process comprising a first unsupervised clustering technique that clusters the historical data for the first timeframe to form a plurality of first historical data clusters, each first historical data cluster comprising a respective subset of the first set of reference construction projects for the first timeframe, wherein the first machine-learning model is configured to (i) receive, as input, data values for a first set of data variables associated with a construction project, and (ii) based on an evaluation of the data values for the first set of data variables, output a prediction of a subset of the first set of reference construction projects that are likely to be similar to the construction project;

at a first time:
  obtain data values for the first set of data variables associated with a given construction project;
  determine a first current timeframe of the given construction project;
  determine that the first current timeframe of the given construction project aligns with the first timeframe associated with the first set of reference construction projects used to train the first machine-learning model;
  input the obtained data values for the first set of data variables into the first machine-learning model and thereby predict a subset of the first set of reference construction projects that are likely to be similar to the given construction project;
  based on the predicted subset of the first set of reference construction projects, determine a predicted value for at least one parameter of the given construction project; and
  cause the predicted value for the at least one parameter of the given construction project to be presented to at least one user;

train a second machine-learning model by carrying out a machine learning process on a second training data set that includes historical data for a second timeframe associated with a second set of reference construction projects, the second machine learning process comprising a second unsupervised clustering technique that clusters the historical data for the second timeframe to form a plurality of second historical data clusters, each second historical data cluster comprising a respective subset of the second set of reference construction projects for the second timeframe, wherein the second machine-learning model is configured to (i) receive, as input, data values for a second set of data variables associated with a construction project, wherein the second set of data variables includes at least one data variable that is not included in the first set of data variables, and (ii) based on an evaluation of the data values for the second set of data variables, output a prediction of a subset of the second set of reference construction projects that are likely to be similar to the construction project; and at a second time after the first time:
  obtain data values for the second set of data variables associated with the given construction project;
  determine a second current timeframe of the given construction project;
  determine that the second current timeframe of the given construction project aligns with the second timeframe associated with the second set of reference construction projects used to train the second machine-learning model;
  input the obtained data values for the second set of data variables into a second machine-learning model and thereby predict a subset of the second set of reference construction projects that are likely to be similar to the given construction project;
  based on the predicted subset of the second set of reference construction projects, determine an updated predicted value for the at least one parameter of the construction project; and
  cause the updated predicted value for the at least one parameter of the given construction project to be presented to at least one user.

2. The computing platform of claim 1, wherein the at least one parameter comprises a cost or a completion time of at least a portion of the construction project.

3. The computing platform of claim 1, further comprising program instructions stored on the non-transitory computer-readable medium that are executable by the at least one processor such that the computing platform is configured to:
  receive, from at least one client station at or before the first time, first information associated with the given construction project,
  wherein obtaining data values for the first set of data variables associated with the given construction project comprises obtaining at least one of the data values for the first set of data variables based on the first information.

4. The computing platform of claim 3, further comprising program instructions stored on the non-transitory computer-readable medium that are executable by the at least one processor such that the computing platform is configured to:
  based on receiving the first information associated with the given construction project, determine that the computing platform has enough information associated with the given construction project to obtain data values for each data variable in the first set of data variables,
  wherein inputting the obtained data values for the first set of data variables into the first machine-learning model comprises inputting the obtained data values for the first set of data variables into the first machine-learning model based on determining that the computing platform has enough information associated with the given construction project to obtain data values for each data variable in the first set of data variables.

5. The computing platform of claim 3, further comprising program instructions stored on the non-transitory computer-readable medium that are executable by the at least one processor such that the computing platform is configured to:
  receive, from at least one client station after the first time and at or before the second time, second information associated with the given construction project,
  wherein obtaining data values for the second set of data variables associated with the given construction project comprises obtaining at least one of the data values for the second set of data variables based on the second information.

6. The computing platform of claim 5, further comprising program instructions stored on the non-transitory computer-readable medium that are executable by the at least one processor such that the computing platform is configured to:
  based on receiving the second information associated with the given construction project, determine that the computing platform has enough information associated with the given construction project to obtain data values for each data variable in the second set of data variables,
  wherein inputting the obtained data values for the second set of data variables into the second machine-learning model comprises inputting the obtained data values for the second set of data variables into the second machine-learning model based on determining that the computing platform has enough information associated with the given construction project to obtain data values for each data variable in the second set of data variables.

7. The computing platform of claim 1, further comprising program instructions stored on the non-transitory computer-readable medium that are executable by the at least one processor such that the computing platform is configured to:
determine respective values of the at least one parameter for reference construction projects in the subset of the first set of reference construction projects,
wherein determining the predicted value for the at least one parameter of the given construction project comprises determining the predicted value for the at least one parameter of the given construction project based on the respective values of the at least one parameter for the reference construction projects in the subset of the first set of reference construction projects.

8. The computing platform of claim 1, further comprising program instructions stored on the non-transitory computer-readable medium that are executable by the at least one processor such that the computing platform is configured to:
determine respective values of the at least one parameter for reference construction projects in the subset of the second set of reference construction projects,
wherein determining the updated predicted value for the at least one parameter of the given construction project comprises determining the updated predicted value for the at least one parameter of the given construction project based on the respective values of the at least one parameter for the reference construction projects in the subset of the second set of reference construction projects.

9. A non-transitory computer-readable medium, wherein the non-transitory computer-readable medium is provisioned with program instructions that, when executed by at least one processor, cause a computing platform to:
train a first machine-learning model by carrying out a machine learning process on a first training data set that includes historical data for a first timeframe associated with a first set of reference construction projects, the first machine learning process comprising a first unsupervised clustering technique that clusters the historical data for the first timeframe to form a plurality of first historical data clusters, each first historical data cluster comprising a respective subset of the first set of reference construction projects for the first timeframe, wherein the first machine-learning model is configured to (i) receive, as input, data values for a first set of data variables associated with a construction project, and (ii) based on an evaluation of the data values for the first set of data variables, output a prediction of a subset of the first set of reference construction projects that are likely to be similar to the construction project;
at a first time:
obtain data values for the first set of data variables associated with a given construction project;
determine a first current timeframe of the given construction project;
determine that the first current timeframe of the given construction project aligns with the first timeframe associated with the first set of reference construction projects used to train the first machine-learning model;
input the obtained data values for the first set of data variables into the first machine-learning model and thereby predict a subset of the first set of reference construction projects that are likely to be similar to the given construction project;
based on the predicted subset of the first set of reference construction projects, determine a predicted value for at least one parameter of the given construction project; and
cause the predicted value for the at least one parameter of the given construction project to be presented to at least one user;
train a second machine-learning model by carrying out a machine learning process on a second training data set that includes historical data for a second timeframe associated with a second set of reference construction projects, the second machine learning process comprising a second unsupervised clustering technique that clusters the historical data for the second timeframe to form a plurality of second historical data clusters, each second historical data cluster comprising a respective subset of the second set of reference construction projects for the second timeframe, wherein the second machine-learning model is configured to (i) receive, as input, data values for a second set of data variables associated with kconstruction project, wherein the second set of data variables includes at least one data variable that is not included in the first set of data variables, and (ii) based on an evaluation of the data values for the second set of data variables, output a prediction of a subset of the second set of reference construction projects that are likely to be similar to the construction project; and
at a second time after the first time:
obtain data values for the second set of data variables associated with the given construction project,
determine a second current timeframe of the given construction project;
determine that the second current timeframe of the given construction project aligns with the second timeframe associated with the second set of reference construction projects used to train the second machine-learning model;
input the obtained data values for the second set of data variables into a second machine-learning model and thereby predict a subset of the second set of reference construction projects that are likely to be similar to the given construction project;
based on the predicted subset of the second set of reference construction projects, determine an updated predicted value for the at least one parameter of the construction project; and
cause the updated predicted value for the at least one parameter of the given construction project to be presented to at least one user.

10. The non-transitory computer-readable medium of claim 9, wherein the at least one parameter comprises a cost or a completion time of at least a portion of the construction project.

11. The non-transitory computer-readable medium of claim 9, wherein the non-transitory computer-readable medium is also provisioned with program instructions that, when executed by the at least one processor cause the computing platform to:
receive, from at least one client station at or before the first time, first information associated with the given construction project,
wherein obtaining data values for the first set of data variables associated with the given construction project comprises obtaining at least one of the data values for the first set of data variables based on the first information.

12. The non-transitory computer-readable medium of claim 11, wherein the non-transitory computer-readable medium is also provisioned with program instructions that, when executed by the at least one processor cause the computing platform to:
based on receiving the first information associated with the given construction project, determine that the computing platform has enough information associated with the given construction project to obtain data values for each data variable in the first set of data variables,
wherein inputting the obtained data values for the first set of data variables into the first machine-learning model comprises inputting the obtained data values for the first set of data variables into the first machine-learning model based on determining that the computing platform has enough information associated with the given construction project to obtain data values for each data variable in the first set of data variables.

13. The non-transitory computer-readable medium of claim 11, wherein the non-transitory computer-readable medium is also provisioned with program instructions that, when executed by the at least one processor cause the computing platform to:
receive, from at least one client station after the first time and at or before the second time, second information associated with the given construction project,
wherein obtaining data values for the second set of data variables associated with the given construction project comprises obtaining at least one of the data values for the second set of data variables based on the second information.

14. The non-transitory computer-readable medium of claim 13, wherein the non-transitory computer-readable medium is also provisioned with program instructions that, when executed by the at least one processor cause the computing platform to:
based on receiving the second information associated with the given construction project, determine that the computing platform has enough information associated with the given construction project to obtain data values for each data variable in the second set of data variables,
wherein inputting the obtained data values for the second set of data variables into the second machine-learning model comprises inputting the obtained data values for the second set of data variables into the second machine-learning model based on determining that the computing platform has enough information associated with the given construction project to obtain data values for each data variable in the second set of data variables.

15. The non-transitory computer-readable medium of claim 9, wherein the non-transitory computer-readable medium is also provisioned with program instructions that, when executed by the at least one processor cause the computing platform to:
determine respective values of the at least one parameter for reference construction projects in the subset of the first set of reference construction projects,
wherein determining the predicted value for the at least one parameter of the given construction project comprises determining the predicted value for the at least one parameter of the given construction project based on the respective values of the at least one parameter for the reference construction projects in the subset of the first set of reference construction projects.

16. The non-transitory computer-readable medium of claim 9, wherein the non-transitory computer-readable medium is also provisioned with program instructions that, when executed by the at least one processor cause the computing platform to:
determine respective values of the at least one parameter for reference construction projects in the subset of the second set of reference construction projects,
wherein determining the updated predicted value for the at least one parameter of the given construction project comprises determining the updated predicted value for the at least one parameter of the given construction project based on the respective values of the at least one parameter for the reference construction projects in the subset of the second set of reference construction projects.

17. A method carried out by a computing platform, the method comprising:
training a first-machine learning model by carrying out a machine learning process on a first training data set that includes historical data for a first timeframe associated with a first set of reference construction projects, the first machine learning process comprising a first unsupervised clustering technique that clusters the historical data for the first timeframe to form a plurality of first historical data clusters, each first historical data cluster comprising a respective subset of the first set of reference construction projects for the first timeframe, wherein the first machine-learning model is configured to (i) receive, as input, data values for a first set of data variables associated with a construction project, and (ii) based on an evaluation of the data values for the first set of data variables, output a prediction of a subset of the first set of reference construction projects that are likely to be similar to the construction project;
at a first time:
obtaining data values for the first set of data variables associated with a given construction project;
determining a first current timeframe of the given construction project;
determining that the first current timeframe of the given construction project aligns with the first timeframe associated with the first set of reference construction projects used to train the first machine-learning model;
inputting the obtained data values for the first set of data variables into the first machine-learning model and thereby predict a subset of the first set of reference construction projects that are likely to be similar to the given construction project;
based on the predicted subset of the first set of reference construction projects, determining a predicted value for at least one parameter of the given construction project;
causing the predicted value for the at least one parameter of the given construction project to be presented to at least one user;
training a second machine-learning model by carrying out a machine learning process on a second training data set that includes historical data for a second timeframe associated with a second set of reference construction projects, the second machine learning process comprising a second unsupervised clustering technique that clusters the historical data for the second timeframe to form a plurality of second historical data clusters, each second historical data cluster comprising a respective subset of the second set of reference construction projects for the second timeframe, wherein the second machine-learning model is configured to (i) receive, as input, data values for a second set of data variables associated with kconstruction project, wherein the second set of data variables includes at least one data variable that is not included in the first set of data variables, and (ii) based on an evaluation of the data values for the second set of data variables, output a prediction of a subset of the second set of reference construction projects that are likely to be similar to the construction project; and at a second time after the first time:
  obtaining data values for the second set of data variables associated with the given construction project,
  determining a second current timeframe of the given construction project;
  determining that the second current timeframe of the given construction project aligns with the second timeframe associated with the second set of reference construction projects used to train the second machine-learning model;
  inputting the obtained data values for the second set of data variables into a second machine-learning model and thereby predict a subset of the second set of reference construction projects that are likely to be similar to the given construction project;
  based on the predicted subset of the second set of reference construction projects, determining an updated predicted value for the at least one parameter of the construction project; and
  causing the updated predicted value for the at least one parameter of the given construction project to be presented to at least one user.

18. The method of claim 17, wherein the at least one parameter comprises a cost or a completion time of at least a portion of the construction project.

19. The method of claim 17, further comprising:
  receiving, from at least one client station at or before the first time, first information associated with the given construction project, wherein obtaining data values for the first set of data variables associated with the given construction project comprises obtaining at least one of the data values for the first set of data variables based on the first information; and
  receiving, from the at least one client station after the first time and at or before the second time, second information associated with the given construction project, wherein obtaining data values for the second set of data variables associated with the given construction project comprises obtaining at least one of the data values for the second set of data variables based on the second information.

20. The method of claim 19, further comprising:
  based on receiving the first information associated with the given construction project, determining that the computing platform has enough information associated with the given construction project to obtain data values for each data variable in the first set of data variables, wherein inputting the obtained data values for the first set of data variables into the first machine-learning model comprises inputting the obtained data values for the first set of data variables into the first machine-learning model based on determining that the computing platform has enough information associated with the given construction project to obtain data values for each data variable in the first set of data variables; and
  based on receiving the second information associated with the given construction project, determining that the computing platform has enough information associated with the given construction project to obtain data values for each data variable in the second set of data variables, wherein inputting the obtained data values for the second set of data variables into the second machine-learning model comprises inputting the obtained data values for the second set of data variables into the second machine-learning model based on determining that the computing platform has enough information associated with the given construction project to obtain data values for each data variable in the second set of data variables.

* * * * *